(12) United States Patent
Blanquart et al.

(10) Patent No.: US 8,823,846 B2
(45) Date of Patent: Sep. 2, 2014

(54) PAUSING DIGITAL READOUT OF AN OPTICAL SENSOR ARRAY

(75) Inventors: Laurent Blanquart, Westlake Village, CA (US); John Wallner, Calabasas, CA (US); Manjunath Bhat, Thousand Oaks, CA (US)

(73) Assignee: AltaSens, Inc., Westlake Village, CA (US)

(*) Notice: Subject to any disclaimer, the term of this patent is extended or adjusted under 35 U.S.C. 154(b) by 445 days.

(21) Appl. No.: 13/109,231

(22) Filed: May 17, 2011

(65) Prior Publication Data
US 2012/0293699 A1    Nov. 22, 2012

(51) Int. Cl.
*H04N 3/14* (2006.01)
*H04N 5/335* (2011.01)

(52) U.S. Cl.
USPC ........... 348/294; 348/296; 348/298; 348/302; 348/308; 348/312

(58) Field of Classification Search
USPC .................. 348/294, 296, 298, 302, 308, 312; 250/208.1; 257/290–292
See application file for complete search history.

(56) References Cited

U.S. PATENT DOCUMENTS

| | | | |
|---|---|---|---|
| 6,888,572 B1 | 5/2005 | Kozlowski | |
| 7,248,295 B2* | 7/2007 | Mitani | 348/241 |
| 7,538,702 B2 | 5/2009 | Baker | |
| 7,760,250 B2 | 7/2010 | Rossi | |
| 7,855,748 B2 | 12/2010 | Rossi et al. | |
| 7,930,580 B2 | 4/2011 | Marchesini et al. | |
| 2011/0096216 A1* | 4/2011 | Kawai et al. | 348/296 |

* cited by examiner

*Primary Examiner* — Yogesh Aggarwal
(74) *Attorney, Agent, or Firm* — Amin, Turocy & Watson, LLP (57) ABSTRACT

Providing for pausing data readout from an optical sensor array is described herein. By way of example, an interruption period can be introduced into a readout cycle of the optical sensor array to suspend readout of data. During the interruption period, other operations related to the optical sensor array can be performed, including operations that are typically detrimental to image quality. Moreover, these operations can be performed while mitigating or avoiding negative impact on the image quality. Thus, greater flexibility is provided for global shutter operations, for instance, potentially improving frame rates and fine control of image exposure, while preserving image quality.

20 Claims, 10 Drawing Sheets

PAUSING DIGITAL READOUT OF AN OPTICAL SENSOR ARRAY

BACKGROUND

Recent developments in semiconductor technology include the complementary metal-oxide-semiconductor (CMOS). CMOS is a technology employed in constructing integrated circuits, producing semiconductor devices having a wide variety of uses in electronic components. These uses can include, for instance, microprocessors, microcontrollers, static random access memory, and other digital logic circuits. Analog uses include data integrators, and integrated transceivers employed in electronic communication, as well as for image sensors.

One particular type of image sensor leveraging CMOS technology is the CMOS image sensor. A CMOS image sensor can be incorporated into a System-on-Chip (SoC). As such, the SoC can integrate various components (e.g., analog, digital, . . . ) associated with imaging into a common integrated circuit. For instance, the SoC can include a microprocessor, microcontroller, or digital signal processor (DSP) core, memory, analog interfaces (e.g., analog to digital converters, digital to analog converters), and so forth.

Visible imaging systems utilizing CMOS imaging sensors can reduce manufacturing costs for such systems, reduce power consumption of an electronic device, and reduce electronic noise, while improving optical resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. The iSoC sensor has also facilitated the advent of more advanced optical recording devices, including dual-use cameras that can alternately produce high-resolution still images or high definition (HD) video.

An image sensor converts an optical image into an electronic signal. This electronic signal can then be processed and reproduced, for instance on a display screen. Typically, the image sensor comprises an array of many active pixels; each active pixel comprising a CMOS photodetector (e.g., photogate, photoconductor, photodiode, . . . ) controlled by circuits of digitally controlled transistors. The CMOS photodetector can absorb electromagnetic radiation in or around the visible spectrum (or more typically a subset of the visible spectrum—such as blue wavelengths, red wavelengths, green wavelengths, etc.), and output an electronic signal proportionate to the electromagnetic energy absorbed.

Electronic imaging devices, such as digital cameras and particularly video recorders, capture and display many optical images per second (e.g., 30 per second, 60 per second, 70 per second, 120 per second, . . . ), equal to the optical frame rate of the imaging device. Capturing a single image in a single frame time involves multiple operations at the CMOS pixel array and readout circuit. One mechanism for image capture is referred to as a rolling shutter. As an example, rolling shutter operations can include capture and convert (e.g., capture light information and convert to electrical information), readout, and reset operations. Some frames can be constructed so that the capture and convert operation, and the reset operation are performed in a single reset cycle, for instance, with reset of a prior frame occurring at a beginning of the reset operation, and capture and convert of a current frame occurring at the end of the reset operation. Thus, alternating reset and readout cycles can clear the CMOS photodetector array, capture a new image, and output the captured image for processing.

Another mechanism for controlling electronic shutter operations for a CMOS image sensor is a global shutter operation. For global shutter operations, all pixels of the CMOS image sensor are reset concurrently. This particular reset is referred to as a global reset. After being reset, the pixels are configured to collect light for an exposure period, (typically having a predetermined duration). Charge is transferred from photodiodes of respective pixels to a floating diffusion node; the transfer of charge is again performed concurrently for all pixels. The transfer of charge is referred to as a global transfer.

For certain global shutter pixels, a correlated double sampling (CDS) operation is conducted over multiple frames. To achieve CDS, a floating diffusion node that will ultimately be used to store the signal charge from the photodetector is reset, and this reset voltage is read out (or output) with respect to a reference voltage. This readout is referred to as a "reset frame". A global transfer is performed to transfer charge from all the image sensor's photodetectors to a corresponding floating diffusion node of the image sensor. Voltage on the floating diffusion node is read out, again with respect to the same reference voltage. This readout is referred to as a "readout frame". The reset frame subtracted from the readout frame provides the actual image value sans the correlated noise present in each of the two frames. CDS can also be performed entirely within the sensor if there is means for storing the reset frame and subsequently subtracting it from the signal frame.

The global shutter can provide advantages over the rolling shutter operation. For instance, global shutter mitigates or avoids some undesirable artifacts observed in the rolling shutter operation, like geometric deformation of moving objects stemming from the capture of object movement at a rate faster than the frame capture rate. Additionally, global shutter operations need not employ a mechanical shutter to capture still images. However, global shutter does present some challenges, which largely are the focus of ongoing research and development in CMOS image sensor technology.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

Various aspects of the disclosure provide for pausing or suspending data readout from an optical sensor array. An interruption period can be introduced into a readout cycle to stop readout of data. During the interruption period, operations typically detrimental to quality of data readout can be performed.

In a particular aspect, an interruption pulse can be employed during select frame cycles to initiate the interruption period within the readout cycle. The interruption pulse can be triggered to enable a global shutter operation on the optical sensor array. In this aspect, effects of the global shutter operation on the readout cycle are mitigated while increasing flexibility of global operations and fine tuning of related image exposure control, potentially improving overall frame rates for the optical sensor array.

According to additional aspects, a state machine can be employed to implement suspending data readout for an optical sensor array. The state machine can instruct a circuit component to generate imitation operation instructions for the suspended data readout. The imitation operation instructions can be employed to maintain congruency between circuit components, during an interruption of a readout cycle. Examples of these circuit components can include vertical and horizontal data transfer buses, an internal data pipeline, a data-path, a data integrator, output amplifier, or mixing nanocode, or the like. Moreover, the state machine can manage respective states, and pausing and restarting of respective circuit components before, during and after an interruption period of a data readout cycle.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

As utilized herein, terms "component," "system," and the like are intended to refer to an electronic or computing entity, either hardware, software (e.g., in execution), or firmware. For example, a component can be one or more semiconductor transistors, an arrangement of semiconductor transistors, a circuit, data transfer or integration circuitry, an electronic clock, a process running on a processor, a processor, an object, a state machine, a computer, etc. By way of illustration, a circuit, a transistor array electrically connected with the circuit, or a controller that manages data flow between the transistor array and the circuit can be a component. Furthermore, an apparatus can comprise one or more components that operate together as a system. For instance, the apparatus can comprise an arrangement of electronic hardware, data transfer circuits, logical control circuits, memory circuits that store processing instructions, and a processing circuit that implements the processing instructions in a manner suitable to perform an electronic or computing task.

Furthermore, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The term "article of manufacture" as used herein is intended to encompass an electronic device, a semiconductor device, a computer, or a computer program accessible from any computer-readable device, carrier, or media. By way of example, and not limitation, computer-readable media can include hardware media, or software media. In addition, the media can include storage media, transport media or communication media. For example, computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include a data transfer bus, a signal interface (e.g., a wireless communication interface), or the like. Of course, those skilled in the art will recognize many modifications can be made to this configuration without departing from the scope or spirit of the disclosed subject matter.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Various aspects disclosed herein provide for mixing data readout operations with global shutter operations associated with image capture and processing for an optical image sensor. In one particular aspect of the subject innovation, a readout frame can be utilized for both outputting data from an array of photodiodes, and for performing global shutter operations on the array. This can be accomplished, for instance, by pausing or suspending outputting of data from the array of photodiodes at some point during the readout frame, performing a global shutter operation, and then completing the outputting of data from the array. Moreover, aspects of the subject disclosure can mitigate or avoid electronic noise caused to data readout operations by the global shutter operations.

For complementary metal oxide semiconductor (CMOS) technology, a CMOS imaging sensor can include an array of CMOS pixel cells, where each pixel cell comprises a photodetector (e.g., a photogate, a photodiode, a photoconductor, . . . ) and a readout circuit. The readout circuit can include at least a source follower transistor. The pixel cell can also include a floating diffusion region connected to a gate of the source follower transistor, and optionally an additional transistor that drains charge from the photodiode without affecting the floating diffusion region. To implement data readout, charge generated at the photodetector can be collected at the floating diffusion region. Further, the pixel cell can include a transistor for resetting the floating diffusion region to a predetermined voltage level prior to charge transference.

Operation of a CMOS pixel cell and associated circuitry can be accomplished by clock signals connected to the pixel cell, and clock pulses executed during an image frame time. At the start of a new frame, a reset pulse can initiate a reset cycle, which resets the floating diffusion region to the predetermined voltage level. A readout pulse can then initiate a readout cycle, causing charge generated by a photodetector to be collected at the floating diffusion region and output for integration and image processing. According to one operational example, the end of the readout cycle can end the image frame time, and a subsequent image frame time begins with a subsequent reset pulse, and so on.

Generally, global shutter operations such as global reset or global transfer operations introduce electrical noise to a CMOS image sensor. Particularly, electrical noise is caused to analog pixel cells and to sensitive peripheral circuitry (e.g., readout circuitry, integration circuitry, . . . ). Accordingly, global operations are generally not performed during readout operations, and so global operations are utilized in what is referred to as a "blanking" period, when readout circuitry is not being used. Although this constraint mitigates noise caused to the image, it reduces flexibility of global operations, in some instances.

As a specific example, noise caused by global shutter operations can induce image artifacts, resulting in a distorted image. For instance, a global shutter operation can generate current spikes greater than a few amps in some CMOS architectures. In turn, these current spikes can cause internal voltage drops in the range of 1 volt. However, since readout circuitry can be sensitive to voltage levels below 1 millivolt, the internal voltage drops caused by the global shutter operation can significantly distort analog voltage levels in the readout circuitry. This results in a corresponding distortion of an image captured by the CMOS image sensors.

To prevent the distortions typically caused by global shutter operations, such operations are performed separately from readout operations. In terms of the image frame time, a blanking period can be introduced for global shutter operations, which is separate from a data readout cycle. However, separating global shutter operations from readout operations can have undesirable effects, since fine control of global reset and global transfer are related to controlling image exposure for the CMOS image sensor. Moreover, introducing blanking in the image frame time reduces frame rate. Accordingly, mixing global shutter operations with data readout operations while avoiding image artifacts typically resulting there from provides a significant advantage in CMOS image sensor technology.

Figure 1:
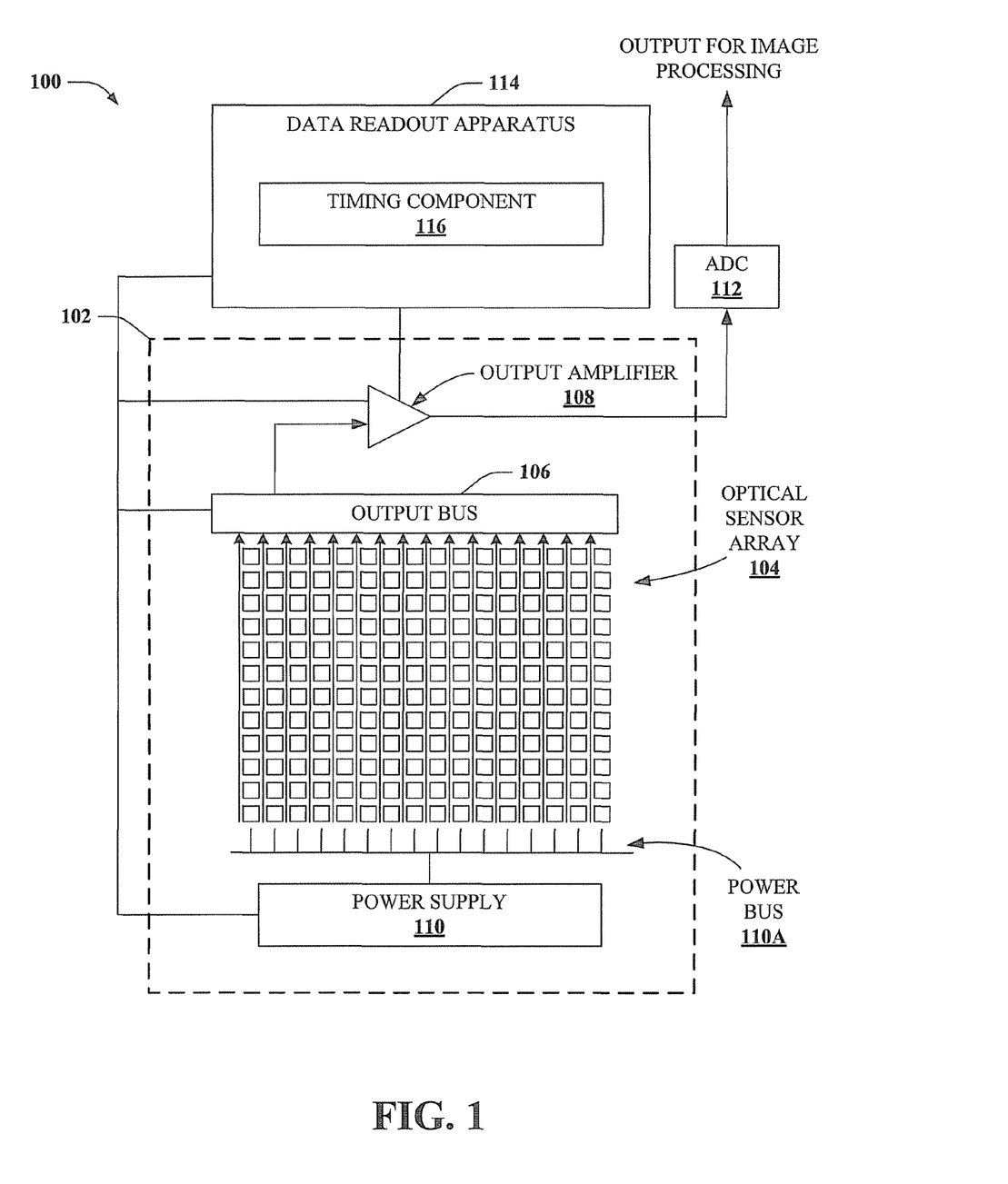
FIG. 1 illustrates a block diagram of an example system that suspends readout of data from an optical sensor according to aspects of the subject disclosure.

Referring to the drawings, FIG. 1 illustrates a block diagram of a sample system 100 for managing electronic operations of a CMOS image sensor 102. Particularly, system 100 can facilitate suspending or pausing a readout cycle of an image time frame. While the readout cycle is suspended, a global shutter operation can be performed. Further, because the readout cycle is suspended, the global shutter operation can have limited effect on voltage levels in the readout circuitry associated with the CMOS image sensor 102. Upon completing the global shutter operation, the readout cycle is re-started, and remaining data is output from the CMOS image sensor 102 for integration and processing.

CMOS image sensor 102 comprises an array of semiconductor photo cells 104. Array of semiconductor photo cells 104 can be configured for receiving optical information and producing an electrical output that is proportional in magnitude to received optical energy. Particularly, the array of semiconductor photo cells 104 is formed from an arrangement of multiple rows and columns of the photo cells. Moreover, array of semiconductor photo cells 104 is electrically connected to a circuit that can be configured to receive the electrical charge from the array, and output the electrical charge in response to an output clock pulse. For instance, each row of photo cells can be connected to a vertical bus, represented by respective arrows beside each particular row. Each vertical bus transfers electronic information from photo cells in an associated row to output bus 106 (also referred to as a horizontal bus), which in turn transfers the data to an output amplifier 108. Output amplifier 108 increases magnitude of the electric signals, and outputs the increased signals to an analog to digital converter (ADC) 112 prior to image processing.

Further to the above, CMOS image sensor 102 is connected to a power supply 110, which can comprise a voltage or current source for CMOS image sensor 102, as well as clock signals for operating optical sensor array 104, output bus 106, output amplifier 108 and ADC 112. Power supply 110 is connected to optical sensor array 104 via a power bus 110A, depicted at the bottom of optical sensor array 104. The clock signals control operations of optical sensor array 104, including optical shuttering, collection, transfer and integration of data, and resetting of pixels.

In at least one aspect of the subject disclosure, system 100 can comprise a data readout apparatus 114. Data readout apparatus 114 can include a timing component 116 configured to interrupt output of electrical charge from the circuit during a readout frame for an interruption period. Interruption of electrical charge from the circuit can be leveraged to facilitate a global shutter operation on optical sensor array 104, during the readout frame. This global shutter operation can include a global transfer operation, a global reset of optical sensor array 104, or the like. Upon completion of the global shutter operation, timing component 116 can re-start the output of electrical charge from the circuit for a remainder of the readout frame.

Figure 2:
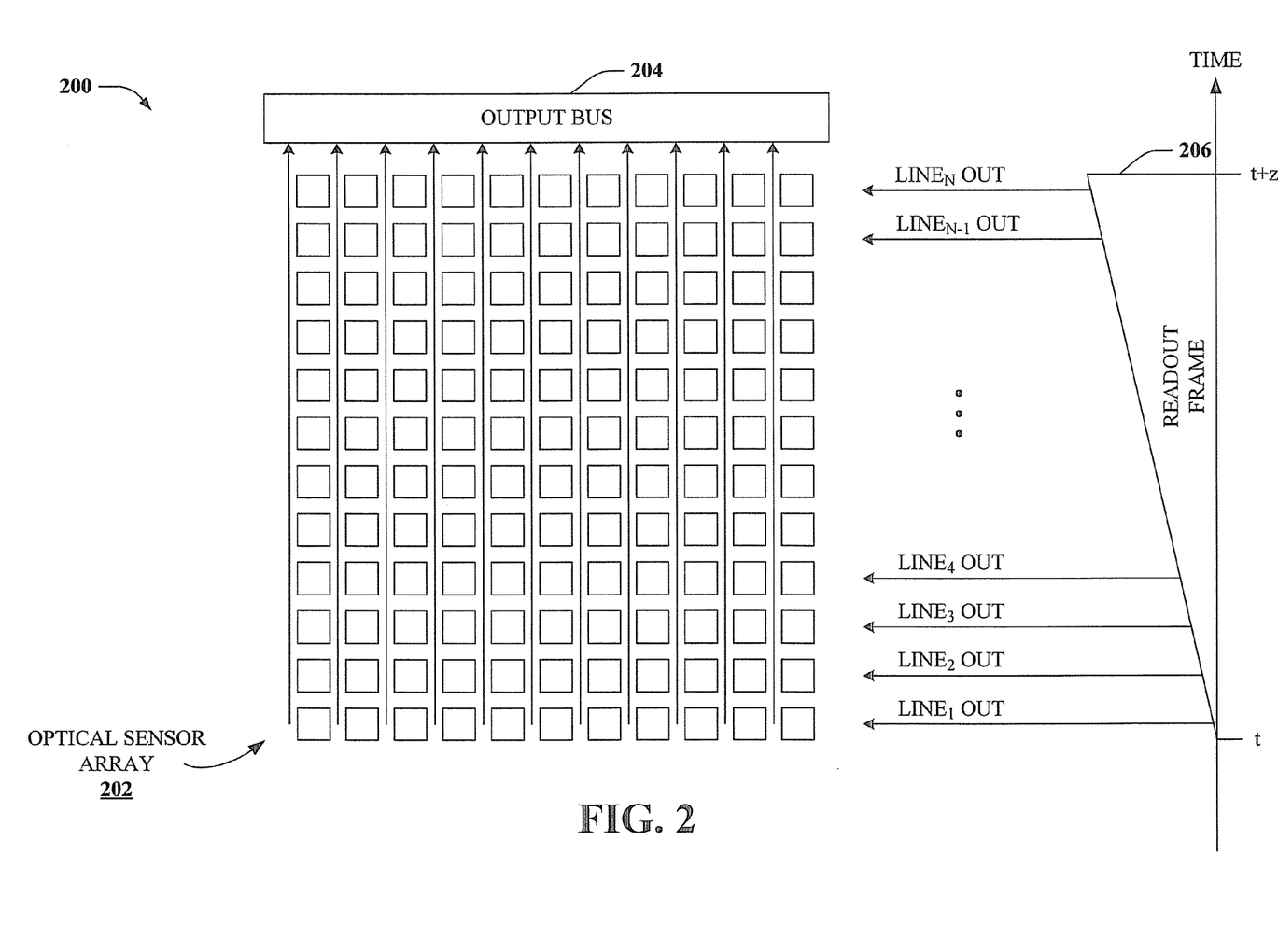
FIG. 2 depicts a block diagram of an optical sensor array and rolling readout operation according to further aspects.

FIG. 2 illustrates a block diagram of a rolling readout operation 200 operative on a CMOS image sensor, according to further aspects of the subject disclosure. The CMOS image sensor comprises an optical sensor array 202 including rows and columns of photodetectors. Each row of photodetectors is electrically connected to a vertical bus, represented by respective arrows beside each row. The vertical buses can be operative to transfer electric signals from an associated row of photodetectors to an output bus 204, for transfer to other data processing components (not depicted).

Figure 4:
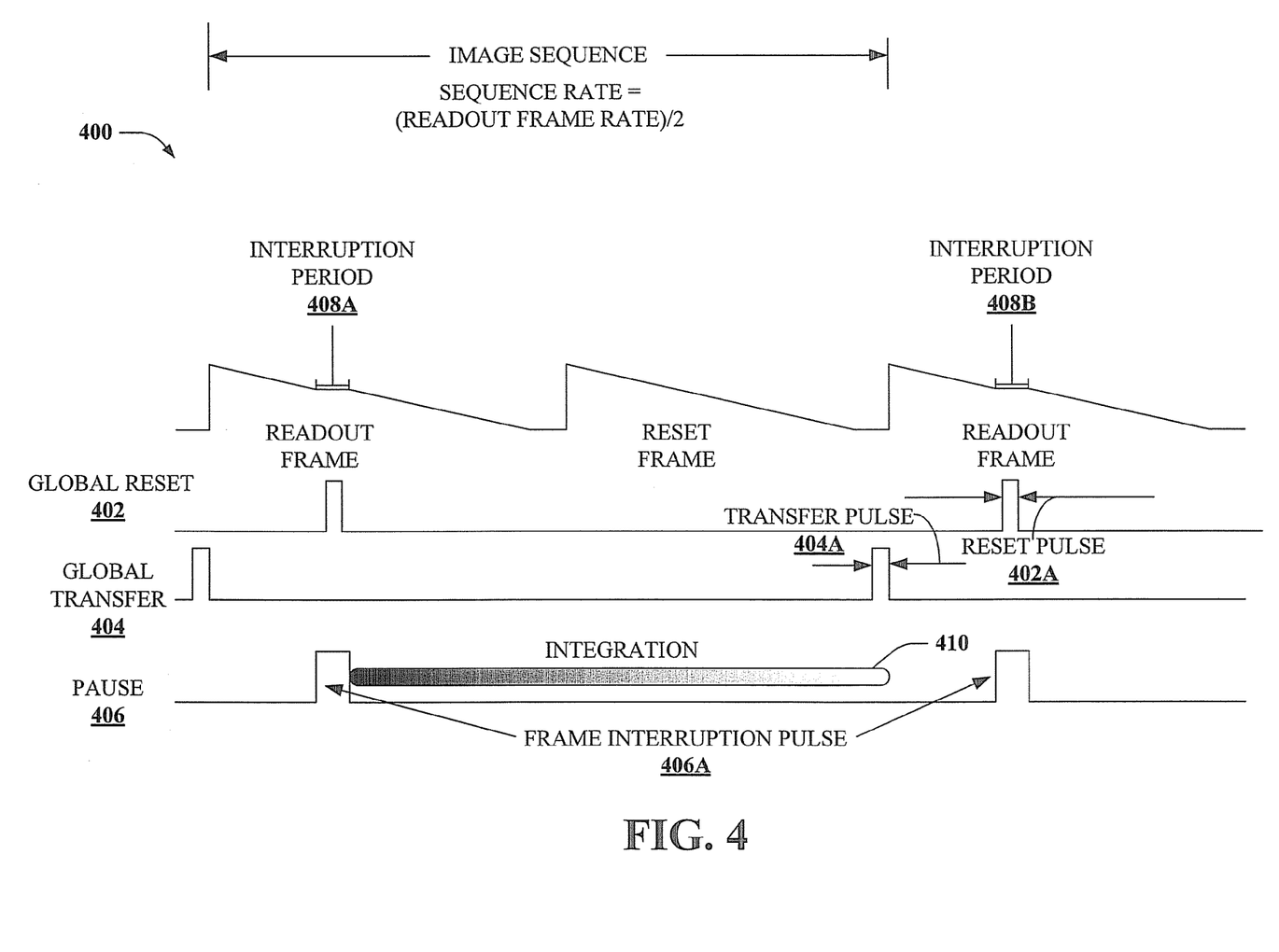
FIG. 4 depicts a diagram of sample pulse signals to facilitate a global shutter operation during a readout pulse for an optical sensor array.

Rolling readout operation 200 illustrates a data readout frame 206, on the right side of FIG. 2, which can be initiated by a readout clock pulse (not depicted, but see e.g., FIG. 4, infra). The data readout frame 206 begins at time t and ends some time later at t+z, where t is any suitable positive time, and z is a duration of data readout frame 206. Upon initiation of data readout frame 206, each row of photodetectors—also referred herein as a line of photodetectors, or simply a line—outputs electric charge (proportional to optical energy received at the photodetectors) to an associated vertical bus. In at least one aspect of the subject disclosure, this output of electric charge can be implemented sequentially from row to row. Thus, $row_1$ or $line_1$ outputs electric charge after initiation of data readout frame 206 after time t, followed by $line_2$, then $line_3$, and $line_4$, and so on, up through $line_{N-1}$ and $line_N$, where N is the number of rows in optical sensor array 202. This sequential output of a subset of the lines, in any order, is also referred to as a rolling readout.

Utilizing the readout implementation depicted by rolling readout operation 200, aspects of the subject disclosure provide for inserting an interruption period at one or more points in a data readout frame 206. The interruption period can facilitate global shutter operations, or other operations on a subset of optical sensor array 202 that could adversely affect image quality if implemented while data is being read from optical sensor array 202. The interruption period can therefore mitigate adverse effects to the image quality, by implementing such operations when no image-related data is being output from optical sensor array 202.

Figure 3:
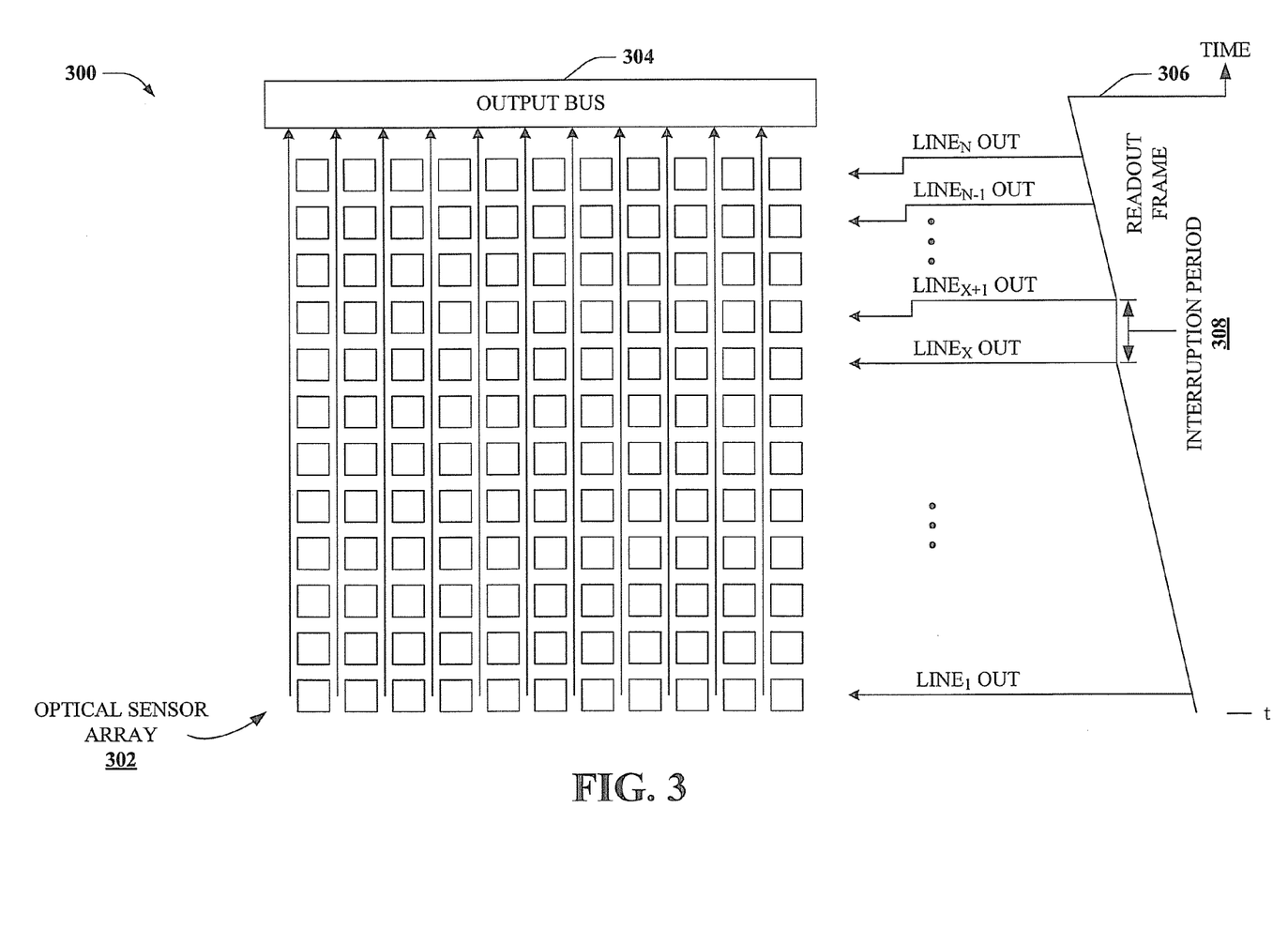
FIG. 3 illustrates a block diagram of an example interruption period for a readout operation in relation to still other aspects.

FIG. 3 illustrates a block diagram of an example rolling readout operation 300, according to additional aspects of the subject disclosure. Rolling readout operation 300 facilitates improved flexibility in operating a photodetector array. Particularly, rolling readout operation 300 can improve fine-tuning of image exposure, improve frame rate for photodetector array-based optics, provide improved flexibility with data transfer and transistor reset operations, among other benefits.

Similar to rolling readout operation 200, rolling readout operation 300 comprises an optical sensor array 302 and an output bus 304. Optical sensor array 302 comprises rows (or lines) and columns of photodetectors, as depicted. It should be appreciated, however, that optical sensor array 302 is not limited to the geometric arrangement depicted. For instance, optical sensor array 302 need not be a rectangular array, but can include other geometric arrangements (e.g., a square array, an oval array, a circular array, a non-geometric or irregular shaped array, etc.).

Additionally, rolling readout operation 300 depicts a data readout frame 306. Data readout frame 306 can be initiated by a readout clock pulse (not depicted). Furthermore, data readout frame 306 includes an interruption period 308. Interruption period can be initiated by a readout interruption pulse (not depicted, but see FIG. 4, infra) that pauses or suspends rolling readout of data from optical sensor array 302.

In operation, data is output from lines of photodetectors of optical sensor array 302 beginning at least with $line_1$ after start of data readout frame 306, and ending at least with $line_N$ prior to (or concurrent with) termination of data readout frame 306. At some time between starting and termination of data readout frame 306, interruption period 308 occurs, in which no data is output from a photodetector of optical sensor array 302. As depicted by rolling readout operation 300, interruption period 308 begins after data is read from $line_X$, and resumes after interruption period 308 with $line_{X+1}$.

In at least one aspect of the subject disclosure, a global shutter operation is performed during interruption period 308. In one particular aspect, a global reset operation is performed during interruption period 308. As yet another alternative or additional aspect, another operation is performed related to optical sensor array 302, wherein the another operation can include an operation that could have a detrimental impact on image quality when the operation is performed during readout of data from optical sensor array 302. In at least one aspect of the subject disclosure, one or more additional operations can be performed in conjunction with a global shutter operation, or in conjunction with another operation having a detrimental impact on image quality, during interruption period 308.

Although interruption period 308 is depicted at a single point in data readout frame 306, it should be appreciated that interruption period 308 can occur at any suitable point during data readout frame 306. In at least one aspect of the subject disclosure, multiple interruption periods 308 can be implemented during data readout frame 306. The multiple interruption periods could be utilized to execute multiple global shutter operations, for instance, or more generally multiple operations that could impact image quality, during data readout frame 306, while mitigating or avoiding negative effects on image quality.

FIG. 4 illustrates a diagram of an example clock frame 400 suitable for data readout for a CMOS image sensor according to particular aspects of the subject disclosure. Particularly, clock frame 400 includes alternating readout frames and reset frames. A single image sequence, involving capturing and reading an image, and resetting associated photodetectors, involves two full readout or reset time frames in this example (e.g., a readout time frame plus a reset time frame). Accordingly, the image sequence rate=(readout frame rate)/2.

A global reset clock 402 controls global reset operations for an image sensor array (not depicted), with each global reset operation being triggered by respective reset pulses 402A initiated by global reset clock 402. A global transfer clock 404 controls readout frames for the image sensor array, by initiating readout pulses 404A. Particularly, respective readout pulses 404A trigger respective readout frames, as depicted.

Further to the above, typical data readout from a CMOS image sensor during a readout frame can be suspended by a pause clock 406. Specifically, pause clock 406 initiates one or more frame interruption pulses 406A. Each frame interruption pulse 406A suspends rolling readout of the image sensor. For instance, a frame interruption pulse 406A can cause an interruption period 408A or 408B in a corresponding readout frame. In at least one aspect of the subject disclosure, interruption period 408A, 408B can have the same duration as frame interruption pulse 406A; starting and ending with the pulse. In other aspects, interruption period 408A, 408B can be triggered by respective frame interruption pulses, having a predetermined duration. Although pause clock 406 is depicted having a single frame interruption pulse 406A per readout frame, it should be appreciated that the frame interruption pulses 406A can be triggered at different times within a readout frame than depicted, in some disclosed aspects; in other aspects, more or fewer frame interruption pulses 406A can be triggered in one or more of the readout frames, or a suitable combination thereof.

Integration time 410 facilitates integration of data that is read out from the CMOS image sensor. For an image sequence comprising a frame interruption pulse 406A, integration time 410 begins after the end of the frame interruption pulse 406A, and can terminate at a suitable point prior to the end of the image sequence, as depicted by integration time 410. Thus, for clock frame 400, (sequence time)/2<integration time 410≤sequence time.

Figure 5:
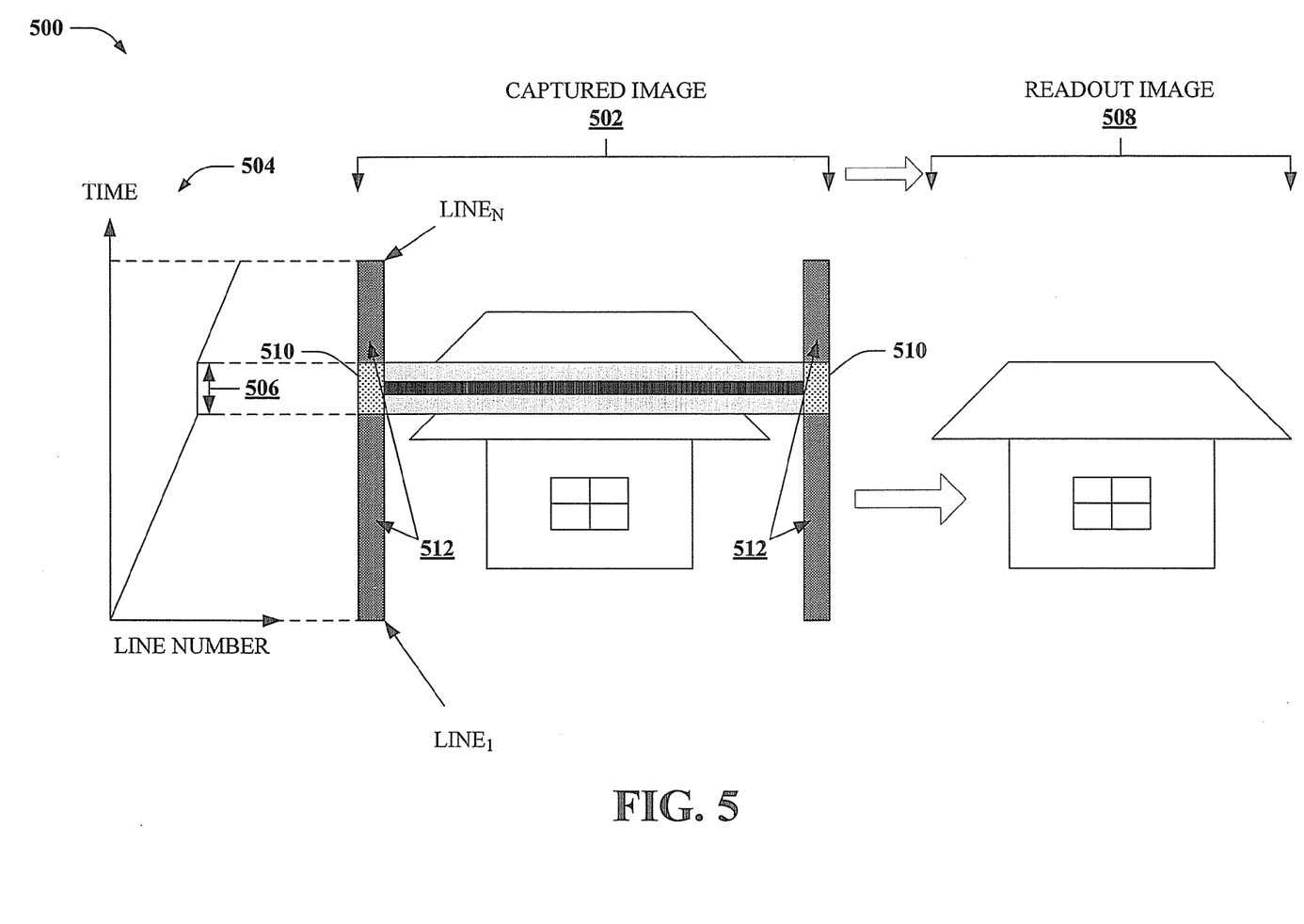
FIG. 5 depicts a diagram of a sample interruption period within rolling readout operation for an optical sensor array and an output image result.

FIG. 5 illustrates a diagram 500 of an example of suspending rolling readout on a captured image, according to further disclosed aspects. An example of a captured image 502 is depicted. Captured image 502 is represented electronically by electric signals that are proportionate to optical energy received by an array of photodetectors (not depicted, but see e.g., optical sensor array 104, optical sensor array 202, or optical sensor array 302, supra). For a rolling readout operation, these electric signals can be read out from the array line-by-line, integrated, amplified and processed for display. A readout frame 504 is depicted in graphical form, having vertical axis representing time and horizontal axis representing a line number of an optical array. Particularly, the line number of readout frame 504 can represent a current line number being read out from a photodetector array.

In one example implementation of photodetector readout, readout frame 504 beings at time=0 with $line_1$, at the bottom of readout frame 504. Line by line readout of electronic information pertaining to captured image 502 therefore proceeds upward from $line_1$ to $line_N$ at the top of readout frame 504, as time increases from time=0. In addition to the foregoing, readout frame 504 comprises an interruption period 506, as depicted. The section of readout frame 504 comprising interruption period 506 is characterized by a period of time over which no electric signals are output from the photodetector array, in effect pausing or suspending line-by-line readout. During this interruption period 506, global shutter operations, or other operations that can affect image quality can be performed, while mitigating or avoiding negative effects of these operations on the image quality, as described herein.

When interruption period 506 begins, a most recent line number read out from the photodetector array (e.g., $line_{X-1}$) can be recorded. When interruption period 506 ends, a subsequent line number (e.g., $line_X$) is read out, and the rolling readout continues up through $line_N$. After end of readout frame 504, electric signals collected from $line_1$ through $line_N$ are integrated and processed into readout image 508, which can be output to a digital display, or a similar device.

According to particular aspects of the subject disclosure, the rolling readout can comprise header/footer instructions, such as start of line (SoL)/end of line (EoL) data, facilitating rolling readout of captured image 502. Particularly, imitation readout instructions 510 are generated during interruption period 506 and distributed to circuit components of the CMOS image sensor associated with image readout. In one instance, the imitation readout instructions 510 can be configured to maintain operational consistency during the interruption period, among the circuit components associated with the output of electrical charge from the photodetector array. Before and after interruption period 506, correct circuit readout instructions 512 are generated (e.g., SoL/EoL data), to facilitate the rolling readout of electric signals associated with captured image 502.

Figure 6:
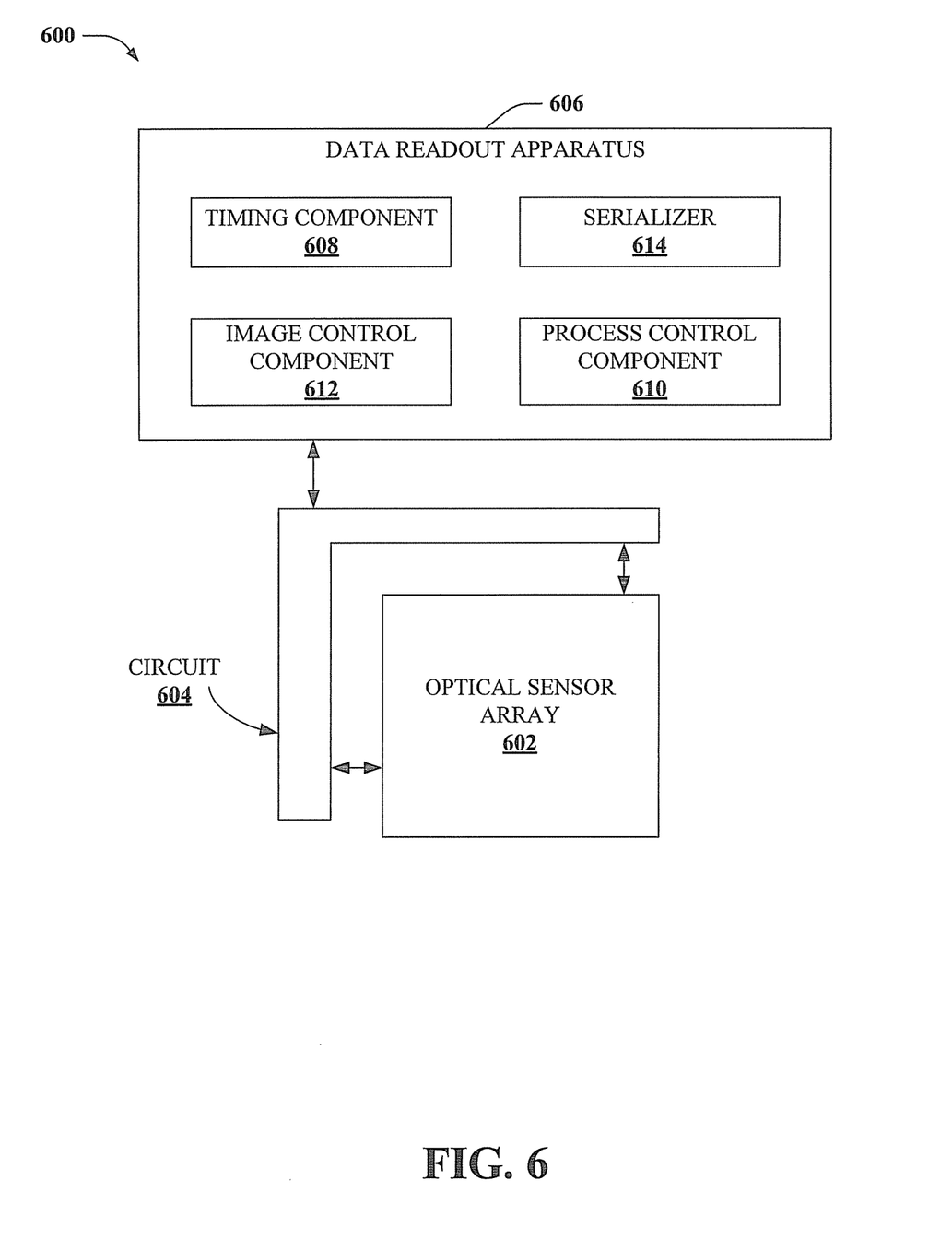
FIG. 6 illustrates a block diagram of a sample system that facilitates mixed global and readout operations for a CMOS image sensor.

FIG. 6 illustrates a block diagram of an example system 600 that can be configured to provide improved control over image exposure, and improved frame rates for optical image sensors, according to one or more aspects of the subject disclosure. System 600 can comprise an optical sensor array 602. Optical sensor array 602 can be configured for receiving optical information and producing an electrical output that is proportional in magnitude to received optical energy. In addition, optical sensor array 602 is electrically connected to a circuit 604 that can be configured to receive the electrical charge from optical sensor array 602, and output the electrical charge in response to an output clock pulse.

A data readout apparatus 606 can be employed for managing circuit 604 by controlling suitable data transfer and data reset clocks (e.g., see FIG. 4, supra) operative to control data readout and transfer operations, and data reset operations of circuit 604. According to one aspect of the subject disclosure, data readout apparatus 606 can comprise a timing component 608 configured to interrupt the output of electrical charge from the circuit in response to the output clock pulse. This interruption of electrical charge can be maintained for an interruption period, during which other operations (e.g., global shutter operation, global reset operation, . . . ) related to circuit 604 or optical sensor array 602 can be performed. In one instance, an image control component 612 can employ timing component 608 to interrupt a readout frame in conjunction with fine-tuning an optical exposure time of optical sensor array 602. As an example, image control component 612 can be configured to reset optical sensor array 602 during the interruption period to control the optical exposure time. Thus, the interruption period enables the optical sensor array to be reset at substantially any time during an image sequence, increasing fine control over related sensor operations, such as exposure time, or the like.

According to further aspects of the subject disclosure, data readout apparatus 606 can comprise a process control component 610 that facilitates interruption of the output of electrical charge in conjunction with timing component 608. Particularly, process control component 610 can receive a command to interrupt the output of electrical charge (e.g., from timing component 608, or from image control component 612). In response to receiving the command, process control component stops output of electrical charge from circuit 604 at a most recent line number (e.g., $line_{X-1}$ of FIG. 3, supra) of optical sensor array 602 that has output electrical charge, during a readout frame. Moreover, process control component 610 pauses output of electrical charge from remaining line numbers of the array for the duration of an interruption period. Upon termination (or expiration) of the interruption period, process control component 610 can re-initiate output of electrical charge beginning with a line number (e.g., $line_X$ of FIG. 3) following the most recent line number.

According to a particular aspect of the subject disclosure, timing component 608 and process control component 610 can act as a system or sub-system for controlling output of data from optical detector array 602 and circuit 604. For instance, timing component can provide a means for suspending data output from the optical sensor array 602 for a portion of an output cycle, following output of a subset of data collected from the optical sensor array 602. Additionally, process control component 610 can provide a means for tracking an end of the subset of data and a beginning of a second subset of data. Moreover, timing component 608 or process control component 610 can provide a means for re-initiating the data output starting at the second subset of data upon expiration of the suspension period.

In alternative or additional aspects of the subject disclosure, process control component 610 can be configured to employ separate instructions to independently pause operation of a subset of circuit components that operate to cause readout of the electrical charge during the readout frame. In one example, the subset of circuit components can comprise a plurality of members of the following set of circuit components: a vertical register, a state machine, a horizontal register, a datapath, and mixing code. In at least one aspect, process control component 610 can comprise a state machine. In this aspect(s), the state machine can be configured to employ a state map program to control respective components of the subset of circuit components during the interruption period. The state map can be configured to control respective states, pausing and re-starting of the respective components. In an alternative, or additional aspect, data readout apparatus 606 can comprise a serializer 614 configured to generate mock data during the interruption period. This mock data can be configured to imitate correct circuit readout instructions employed by one or more of the subset of circuit components. For instance, the mock data can comprise application specific integrated circuit (ASIC) header, trailer or payload data associated with a rolling readout operation. This ASIC information can be organized to maintain operational consistency among circuit components associated with circuit 604, related to output of electrical charge from optical sensor array 602.

The aforementioned diagrams have been described with respect to interaction between several systems, apparatuses, components, electronic circuits, or photodetector arrays. It should be appreciated that such diagrams can include those components or systems specified therein, some of the specified components, or additional components. For example, a system could include optical sensor array 104, output bus 106 and output amplifier 108, in conjunction with data readout apparatus 606. Sub-components could also be implemented as architectures electrically connected to other sub-components rather than included within a parent architecture. Additionally, it should be noted that two or more components could be combined into a single component providing aggregate functionality. For instance, timing component 608 can include image control component 612 to facilitate pausing or suspending a rolling readout in conjunction with fine-tuning optical exposure time of an optical sensor array, by way of a single component. Components of the disclosed systems and apparatuses can also interact with one or more other components not specifically described herein but known by those of skill in the art, or made known to one of skill in the art by way of the context provided herein.

Figure 7:
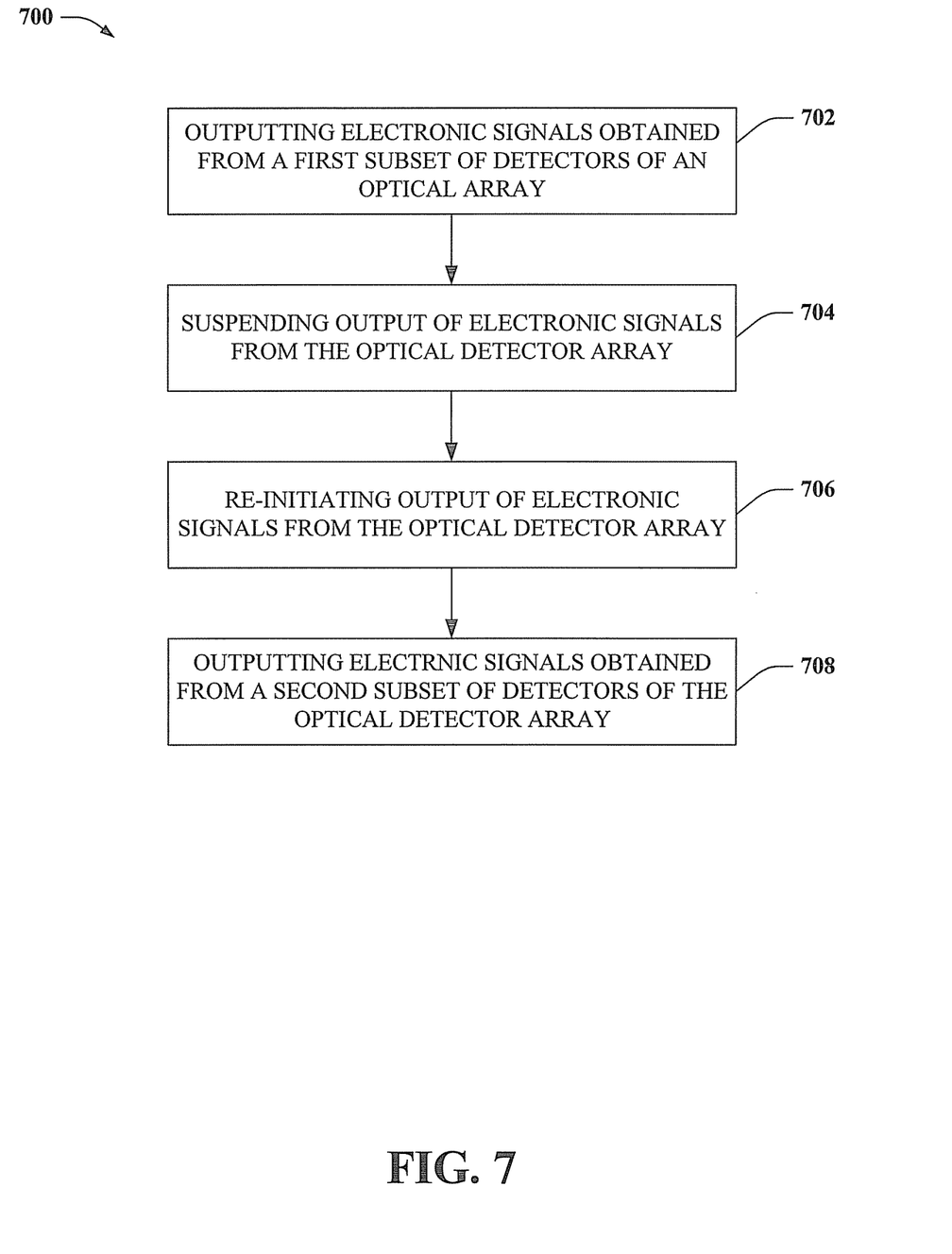
FIG. 7 depicts a flowchart of a sample method for suspending data readout for an optical sensor according to one or more aspects of the subject disclosure.
Figure 8:
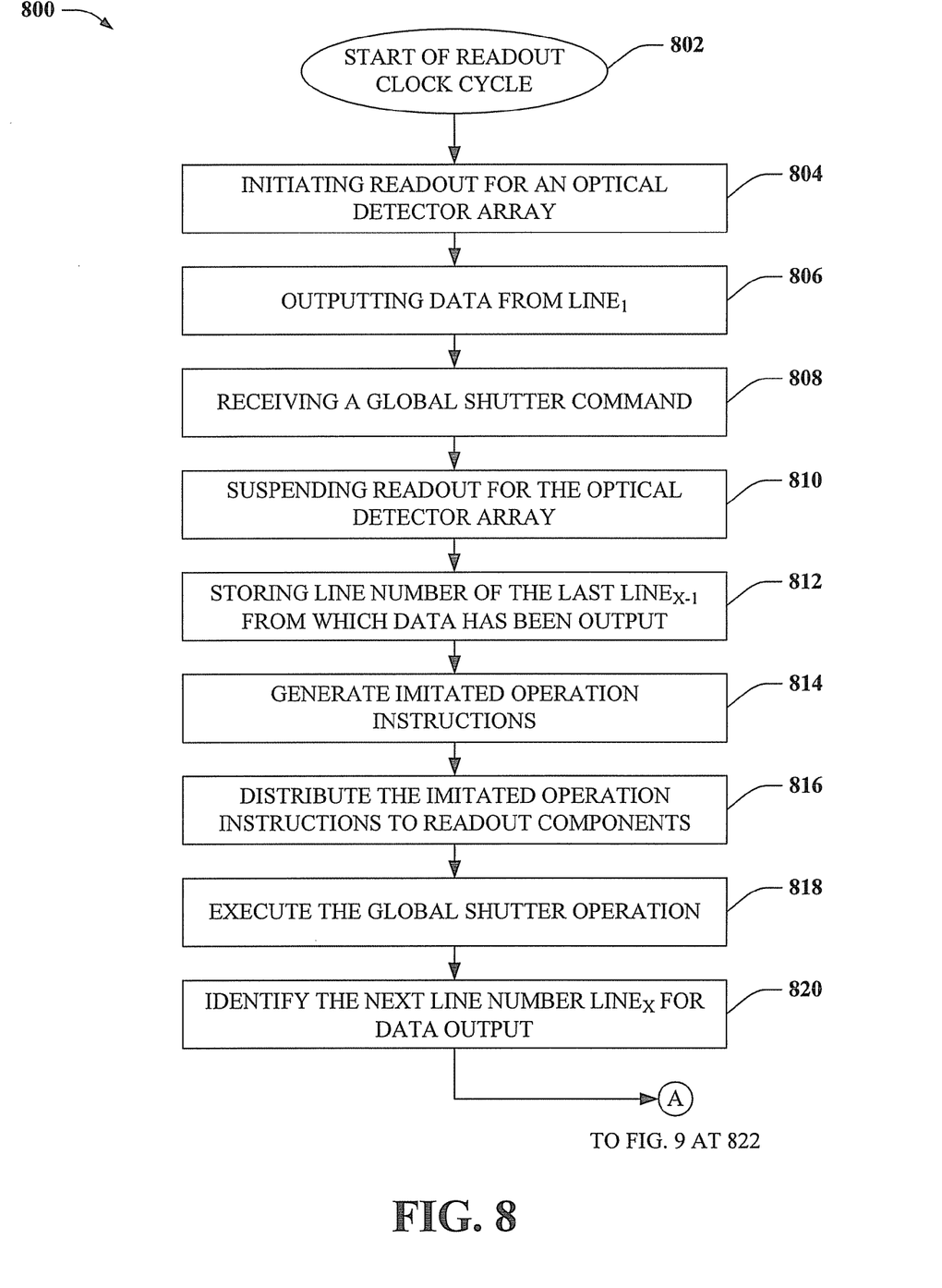
FIGS. 8 and 9 illustrate a flowchart of an example method for mixing readout and global shutter operations for an image sensor in a single readout cycle.
Figure 9:
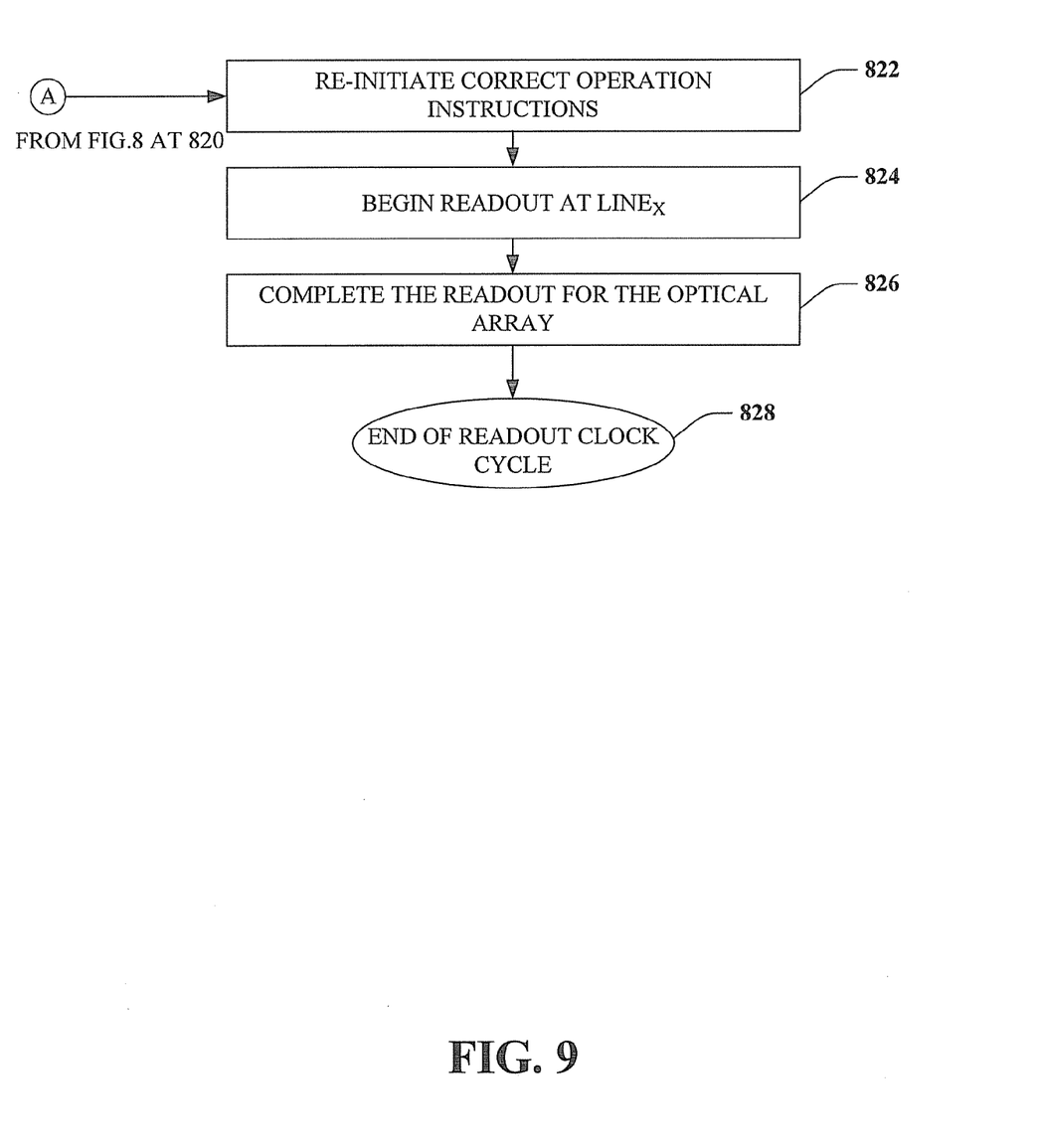

In view of the exemplary diagrams described supra, process methods that may be implemented in accordance with the disclosed subject matter will be better appreciated with reference to the flow charts of FIGS. 7-9. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

FIG. 7 illustrates a flowchart of an example method 700 for suspending data output for an optical sensor array during a readout frame, according to aspects of the subject disclosure. At 702, method 700 can comprise outputting electronic signals obtained from a first subset of detectors of an optical detector array. The first subset of detectors can include, for instance, a first subset of lines of the optical detector array (e.g., $line_1$ through $line_X$, where X is any suitable integer greater than or equal to 1, and less than a total number, N, of lines in the optical detector array).

At 704, method 700 can comprise suspending output of electronic signals from the optical detector array. As an example, suspending output of electronic signals can be in response to a clock pulse that triggers suspending the output. Moreover, a duration of suspended output can be equal to a duration of the clock pulse, or can be independent of the duration of the clock pulse. As one specific example of the latter alternative, suspending the output can begin upon detecting the clock pulse, and the suspending can be maintained for a duration (e.g., a predetermined duration) that is independent of the duration of the clock pulse.

Additionally, at 706, method 700 can comprise re-initiating output of electronic signals from the optical detector array. The re-initiating can be configured to occur when a duration associated with the suspending of output of electronic signals expires. At 708, method 700 can comprise outputting electronic signals obtained from a second subset of detectors of the optical detector array. This second subset of detectors can include, continuing the previous example, lines of the photodetector from $line_{X+1}$ through $line_N$.

FIGS. 8 and 9 illustrate a flowchart of a sample method 800 for providing increased flexibility and fine control of global shutter operations related to an optical image sensor, according to still other aspects disclosed herein. At 802, method 800 can start with the start of a readout clock cycle. At 804, method 800 can comprise initiating readout for an optical photodetector array. At 806, method 800 can comprise outputting data from a first line of the optical photodetector array (e.g., $line_1$, $line_N$, or another suitable starting line).

At 808, method 800 can comprise receiving a global shutter command. At 810, method 800 can comprise suspending readout for the optical photodetector array. At 812, method 800 can comprise storing a line number of the last line (e.g., $line_{X-1}$) from which data has been output, per reference number 806. At 814, method 800 can comprise generating imitated operation instructions for circuit components associated with the readout. At 816, method 800 can comprise distributing the imitated operation instructions to circuit components associated with the optical photodetector array, which are related to the readout. At 818, method 800 can comprise executing the global shutter operation. And, at 820, method 800 can comprise identifying the next line number (e.g., $line_X$) for data output.

Referring now to FIG. 9, at 822, method 800 can comprise re-initiating correct operation instructions. At 824, method 800 can comprise beginning data readout from optical photodetector array at a line having the next line number (e.g., $line_X$). At 826, method 800 can comprise completing readout for the optical photodetector array, by reading out data for each line of the optical photodetector array, or by termination of a readout clock cycle. At 828, method 800 ends with the end of the readout clock cycle.

Figure 10:
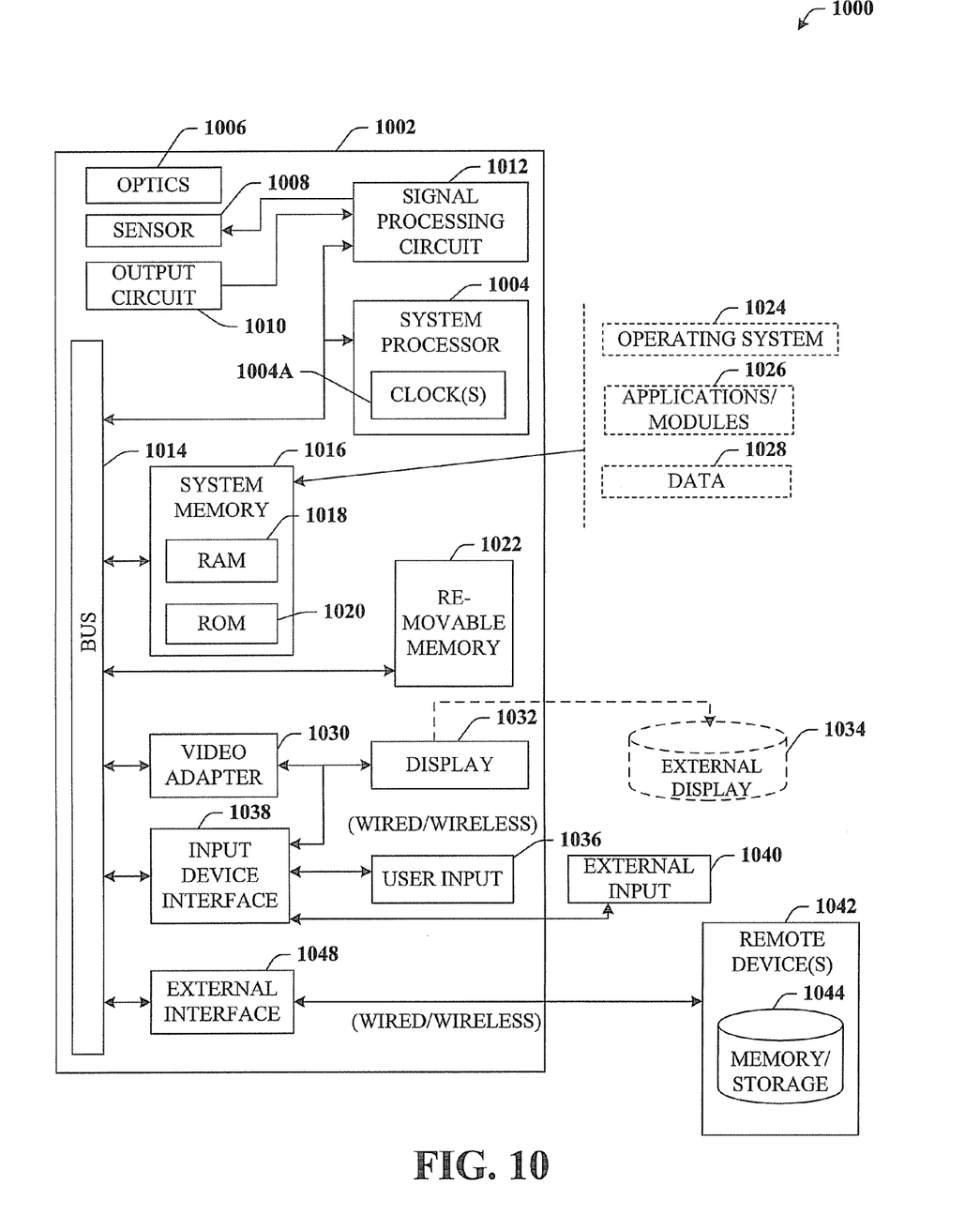
FIG. 10 depicts an example operating environment that can be employed in accordance with various disclosed aspects.

Referring now to FIG. 10, there is illustrated a block diagram of an exemplary digital camera system operable to execute the disclosed architecture. In order to provide additional context for various aspects of the various embodiments, FIG. 10 and the following discussion are intended to provide a brief, general description of a suitable electronic computing environment 1000 in which the various aspects of the various embodiments can be implemented. Additionally, while the various embodiments described above may be suitable for application in the general context of instructions that may run or be executed in conjunction with an electronic device, those skilled in the art will recognize that the various embodiments also can be implemented in combination with other program modules and/or as a combination of hardware and software.

Generally, program modules include routines, programs, components, data structures, etc., that perform particular tasks associated with electronic computing environment 100. Moreover, those skilled in the art will appreciate that the inventive methods can be practiced with other electronic system configurations, including hand-held computing devices, microprocessor-based or programmable consumer electronics, single-processor or multiprocessor state machines, minicomputers, as well as personal computers, and the like, each of which can be operatively coupled to one or more associated devices.

The illustrated aspects of the various embodiments may also be practiced in distributed computing environments where certain tasks are performed by remote processing devices that are linked through a wired or wireless communications network. In a distributed computing environment, program modules can be located in both local and remote memory storage devices.

An electronic processing device typically includes a variety of computer-readable media. Computer-readable media can be any available media that can be accessed by the electronic processing device and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, or any other medium which can be used to store the desired information and which can be accessed by the electronic processing device.

Continuing to reference FIG. 10, the exemplary electronic processing environment 1000 for implementing various aspects of one or more of the various embodiments includes a digital camera 1002, the digital camera 1002 including a system processor 1004, optics 1006, an image sensor 1008, an output circuit 1010, a signal processing circuit 1012, a system memory 1016 and a system bus 1014. The system bus 1014 couples to system components including, but not limited to, the system memory 1016 to the system processor 1004. The system processor 1004 can be a suitable semiconductor processing device manufactured for digital camera 1002, or any of various commercially available processors. Dual microprocessors and other multi-processor architectures may also be employed as the system processor 1004.

Optics 1006 can comprise one or more lens elements comprised of refractive material. The refractive material can be suitable to refract electromagnetic radiation, particularly in the visible spectrum, but also the near infrared or ultraviolet spectra, or other suitable spectra. Particularly, optics 1006 can be configured to project and focus an image of an object onto image sensor 1008. Optics can also be configured with an actuator (not depicted) to mechanically adjust optics 1006 to focus objects at varying distances from digital camera 1002.

Image sensor 1008 can comprise any of various sensors for receiving electromagnetic radiation and generating electric signals proportionate to a magnitude of the electromagnetic radiation. For instance, image sensor 1008 can comprise a video tube, a charge-coupled device, or a CMOS device, or the like, or an array of such devices. In a particular example, image sensor 1008 can comprise an array of photodetectors as described herein (e.g., optical sensor array 104, optical sensor array 202, optical sensor array 302, optical sensor array 602, etc.). Electric signals generated by image sensor 1008 can be transferred to output circuit 1010, in response to a clock signal generated by an electronic clock(s) 1004A managed by system processor 1004. The electric signals can then be output to signal processing circuit 1012 for image processing.

Signal processing circuit 1012 can be any suitable hardware or software processing entity, including an integrated circuit(s), an application specific integrated circuit(s) (ASIC), a state machine, or other suitable signal processing device. Signal processing circuit 1012 can be configured to perform operations on electric signals provided by output circuit 1010. These operations can include correlated double sampling, gamma processing, analog to digital conversion, gain adjustment, interpolation, compression, or a combination thereof or of the like, to generate digital data to be adapted for presentation on an electronic display 1032 of digital camera 1002. Additionally, signal processing circuit 1012 can store the digital data in system memory 1016 before, during and after the operations.

The system bus 1014 can be any of several types of bus structure suitable for communicatively connecting components of digital camera 1002. System bus 1014 can further interconnect to a memory bus (with or without a memory controller), a peripheral bus, and a local bus using any of a variety of commercially available bus architectures. The system memory 1016 can include read-only memory (ROM) 1020 and random access memory (RAM) 1018. A basic input/output system (BIOS) for digital camera 1002 can be stored in a non-volatile memory 1020 such as ROM, EPROM, EEPROM, which BIOS contains the basic routines that help to transfer information between elements within the digital camera 1002, when powered on for instance. The RAM 1018 can also include a high-speed RAM such as static RAM for caching data. Furthermore, digital camera can include removable memory 1022, which can include any suitable non-volatile memory (e.g., Flash memory), or other removable memory technology.

A number of program modules can be stored in the system memory 1016, including an operating system 1024, one or more application programs or program modules 1026 and program data 1028. All or portions of the operating system, applications, modules, and/or data can also be cached in the RAM 1018 It is appreciated that the various embodiments can be implemented with various commercially available or proprietary operating systems or combinations of operating systems.

A display 1032 is also connected to the system bus 1014 via an interface, such as a video adapter 1030. Display 1032 can comprise a flat panel display, such as a liquid crystal display, a light-emitting diode display, or the like. System processor 1004 can control output of image data to present a digital replica of the image received by image sensor 1008 on display 1032. In addition, digital camera 1002 can output the image data to an external display 1034 via a suitable external interface 1048.

A user can enter commands and information into the digital camera 1002 through one or more input devices, e.g., touch screen buttons, switches, dials, levers, etc. For instance, zoom functionality is often implemented by pressing a button, dial, lever, etc., in one direction to zoom in, or another direction to zoom out. Further, display options, selection of images, and similar display commands can be input via a touch screen, often implemented as part of display 1032. Other input devices (not shown) may include a microphone, an IR remote control, a joystick, a game pad, a stylus pen, or the like. These and other input devices are often connected to the system processor 1004 through an input device interface 1038 that is coupled to the system bus 1014, but can be connected by other interfaces, such as a parallel port, an IEEE1394 serial port, a game port, a USB port, an IR interface, a Bluetooth interface, etc.

The external interface 1048 can include at least one or both of Universal Serial Bus (USB) and IEEE1394 interface technologies. Other external connection technologies are within contemplation of the subject matter claimed herein. Moreover, external interface 1048 can include a wireless technology, such as a Wi-Fi communication technology, Bluetooth™ technology, infrared (IR) technology, cellular technology, or the like. In addition to an external display, external interface 1048 can facilitate communicatively coupling digital camera 1002 to one or more remote devices 1042. Remote device(s) 1042 can include a computer, a display, a memory or storage device 1044, and so on. Moreover, commands can be given to digital camera 1002 from remote device(s) 1042 over external interface 1048 to system processor 1004. This can facilitate remote control of digital camera 1002, for remote camera operation (e.g., taking pictures, adding or deleting pictures from system memory 1016, etc.), transferring data, such as stored digital images, updating operation system 1024, applications/program modules 1026, or data 1028, and so on.

The digital camera 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi, or Wireless Fidelity, allows connection to the Internet from various locations within range of a WiFi access point, without wires. Wi-Fi is a wireless technology similar to that used in a cell phone that enables such devices, e.g., computers, to send and receive data indoors and out; within the range of the access point. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the various embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An apparatus that facilitates data management for an optical sensor array, comprising:
    an array of optical sensors for receiving optical information and producing electrical charge that is related in magnitude to received optical energy;
    a circuit electrically connected to the array of optical sensors and configured to receive subsets of the electrical charge from the array, and output a first subset of the electrical charge during a first portion of an output cycle;
    a timing component configured to interrupt the output of electrical charge from the circuit following the first portion of the output cycle for an interruption period, wherein at least a second subset of the electrical charge is preserved by the circuit during the interruption period; and
    a process control component that receives a command to interrupt the output of electrical charge and stops output of electrical charge from the circuit at a most recent line number of the array having output electrical charge following receipt of the command at the process control component.

2. The apparatus of claim 1, wherein the interruption period facilitates a global shutter operation on the array during the output cycle.

3. The apparatus of claim 2, wherein the global shutter operation comprises a global reset of the array of optical sensors.

4. The apparatus of claim 2, wherein the global operation comprises a global operation having an impact on image quality when implemented during output of electrical charge from the array of optical sensors.

5. The apparatus of claim 1, further comprising an image control component that employs the timing component to interrupt the output cycle in conjunction with fine-tuning an optical exposure time of the array of optical sensors.

6. The apparatus of claim 5, wherein the image control component resets the array of optical sensors during the interruption period to fine-tune the optical exposure time.

7. The apparatus of claim 1, further comprising a wherein the process control component further:
    pauses output of electrical charge from remaining line numbers of the array for the interruption period; and
    re-initiates output of electrical charge beginning with a line number following the most recent line number after the interruption period ends.

8. The apparatus of claim 7, wherein the process control component employs separate instructions to independently pause operation of a subset of circuit components that operate to cause readout of the electrical charge during the output cycle.

9. The apparatus of claim 8, wherein the subset of circuit components comprises a plurality of members of the following set of circuit components: a vertical register, a state machine, a horizontal register, a datapath or a mixing code.

10. The apparatus of claim 8, wherein the process control component is a state machine.

11. The apparatus of claim 10, wherein the state machine employs a state map program to control respective components of the subset of circuit components during the interruption period.

12. The apparatus of claim 11, wherein the state map program controls states, pausing, and re-starting of the respective components.

13. The apparatus of claim 1, further comprising a serializer that generates mock data during the interruption period that imitates correct circuit readout instructions.

14. The apparatus of claim 13, wherein the mock data comprises application specific integrated circuit header, trailer or payload data and is configured to maintain operational consistency among circuit components associated with the output of electrical charge.

15. A method for reading data from an optical detector array, comprising:
- outputting electronic signals obtained from a first subset of detectors of the optical detector array;
- receiving a command to suspend the outputting electronic signals;
- suspending output of electronic signals from the optical detector array in response to receiving the command, the suspending output begins with a subsequent line number not having been output from the optical detector array following receipt of the command;
- re-initiating output of electronic signals from the optical detector array; and
- outputting electronic signals obtained, prior to the suspending output, from a second subset of detectors of the optical detector array.

16. The method of claim 15, further comprising executing a global shutter operation after suspending output and before re-initiating output of the electronic signals.

17. The method of claim 15, wherein the outputting, suspending, reinitiating and outputting are performed in a single readout cycle of the optical detector array.

18. The method of claim 17, wherein the suspending and re-initiating are performed over a fraction of the single readout cycle.

19. The method of claim 15, further comprising:
- generating imitated operation instructions configured to cause components of the optical detector array to suspend the output of electronic signals;
- distributing the imitated operation instructions to components of the optical detector array during suspending of the output; and
- distributing genuine operation instructions configured to cause the components of the optical detector array to re-initiate output of electronic signals starting with the electronic signals obtained from the second subset of detectors.

20. A system configured to output data from an optical detector array,
comprising:
- means for suspending data output from the optical detector array in response to a command for a portion of an output cycle following output of a subset of data collected from the optical detector array, wherein the subset of data is not predetermined in length and terminates with a most recent line number having been output from the optical detector array prior to receipt of the command;
- means for tracking a beginning of a second subset of data beginning with a subsequent line number of the optical detector array following the most recent line number; and
- means for re-initiating the data output starting at the subsequent line number upon expiration of a suspension period.

* * * * *